United States Patent
Kurtz et al.

(10) Patent No.: US 11,613,143 B2
(45) Date of Patent: Mar. 28, 2023

(54) WHEEL FOR A CART

(71) Applicant: Land to Sand Easy Carts, LLC, Lititz, PA (US)

(72) Inventors: Shirley Miller Kurtz, Lititz, PA (US); David Lee Stoner, Manheim, PA (US)

(73) Assignee: Land to Sand Easy Carts, LLC, Lititz, PA (US)

( * ) Notice: Subject to any disclaimer, the term of this patent is extended or adjusted under 35 U.S.C. 154(b) by 979 days.

(21) Appl. No.: 16/420,677

(22) Filed: May 23, 2019

(65) Prior Publication Data

US 2019/0358995 A1 Nov. 28, 2019

Related U.S. Application Data

(60) Provisional application No. 62/675,538, filed on May 23, 2018.

(51) Int. Cl.
| | | |
|---|---|---|
| *B62B 3/02* | (2006.01) | |
| *B60B 19/00* | (2006.01) | |
| *B62B 3/14* | (2006.01) | |

(52) U.S. Cl.
CPC ............... *B60B 19/00* (2013.01); *B62B 3/02* (2013.01); *B62B 3/1492* (2013.01); *B60B 2200/43* (2013.01); *B62B 2202/52* (2013.01)

(58) Field of Classification Search
CPC ..... B62B 3/02; B62B 3/1492; B62B 2202/52; B60B 19/00; B60B 2200/43
See application file for complete search history.

(56) References Cited

U.S. PATENT DOCUMENTS

| | | | |
|---|---|---|---|
| 3,034,801 A | 5/1962 | Huston | |
| 3,236,537 A | 2/1966 | Eckman | |
| 3,764,072 A * | 10/1973 | Morehouse | ........... B05B 9/0833 |
| | | | 239/722 |
| 4,266,791 A | 5/1981 | Myers | |
| 4,523,774 A | 6/1985 | Dickerson | |
| 4,789,180 A | 12/1988 | Bell | |
| 5,026,079 A | 6/1991 | Donze et al. | |
| 5,074,576 A | 12/1991 | Finlay | |
| 5,492,347 A | 2/1996 | Palmeri et al. | |
| 5,879,022 A | 3/1999 | Winton | |
| 6,543,800 B1 | 4/2003 | Doran | |
| 7,017,939 B2 | 3/2006 | Darling, III | |
| 7,347,240 B2 * | 3/2008 | Tanaka | ..................... B60C 17/06 |
| | | | 152/384 |
| 7,762,363 B1 * | 7/2010 | Hirschfeld | ............... B60K 1/04 |
| | | | 280/651 |
| 8,152,178 B2 | 4/2012 | Sun et al. | |
| 8,678,053 B2 * | 3/2014 | Harris | .................. A63H 17/262 |
| | | | 152/209.5 |
| 2002/0070517 A1 | 6/2002 | Ramsey | |
| 2002/0125667 A1 | 9/2002 | Sciulli | |
| 2005/0012308 A1 | 1/2005 | Swanner | |
| 2007/0194560 A1 | 8/2007 | Zink | |
| 2010/0078907 A1 | 4/2010 | Voves | |
| 2010/0270764 A1 | 10/2010 | Odle et al. | |
| 2013/0200685 A1 * | 8/2013 | Morris | ................... B60B 37/04 |
| | | | 301/111.03 |
| 2014/0097599 A1 | 4/2014 | Panigot | |

* cited by examiner

*Primary Examiner* — James M Dolak
*Assistant Examiner* — James J Triggs
(74) *Attorney, Agent, or Firm* — Barley Snyder

(57) ABSTRACT

A wheel for a cart comprises a hollow cylindrical body. The hollow cylindrical body is formed of a stiff material and has a corrugated outer surface and a corrugated inner surface.

18 Claims, 5 Drawing Sheets

WHEEL FOR A CART

CROSS-REFERENCE TO RELATED APPLICATION

This application claims priority under 35 U.S.C. § 119 to U.S. Provisional Patent Application No. 62/675,538, filed May 23, 2018.

FIELD OF THE INVENTION

The present invention relates to a wheel and, more particularly, to a wheel for a cart used to transport a load.

BACKGROUND

Many types of wheeled carts exist to assist pedestrians in transporting loads. The wheels of these carts are often ineffective at traversing difficult terrain, such as rocks, loose soil, or sand, while transporting the load. For example, solid wheels having a thin width are often used, but these wheels add significant weight to the cart and sink into the difficult terrain. Other larger, inflatable wheels for carts are also available and designed for terrain such as sand. These inflatable wheels, however, require frequent re-inflation, especially when used only periodically, and have low durability.

SUMMARY

A wheel for a cart comprises a hollow cylindrical body. The hollow cylindrical body is formed of a stiff material and has a corrugated outer surface and a corrugated inner surface.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
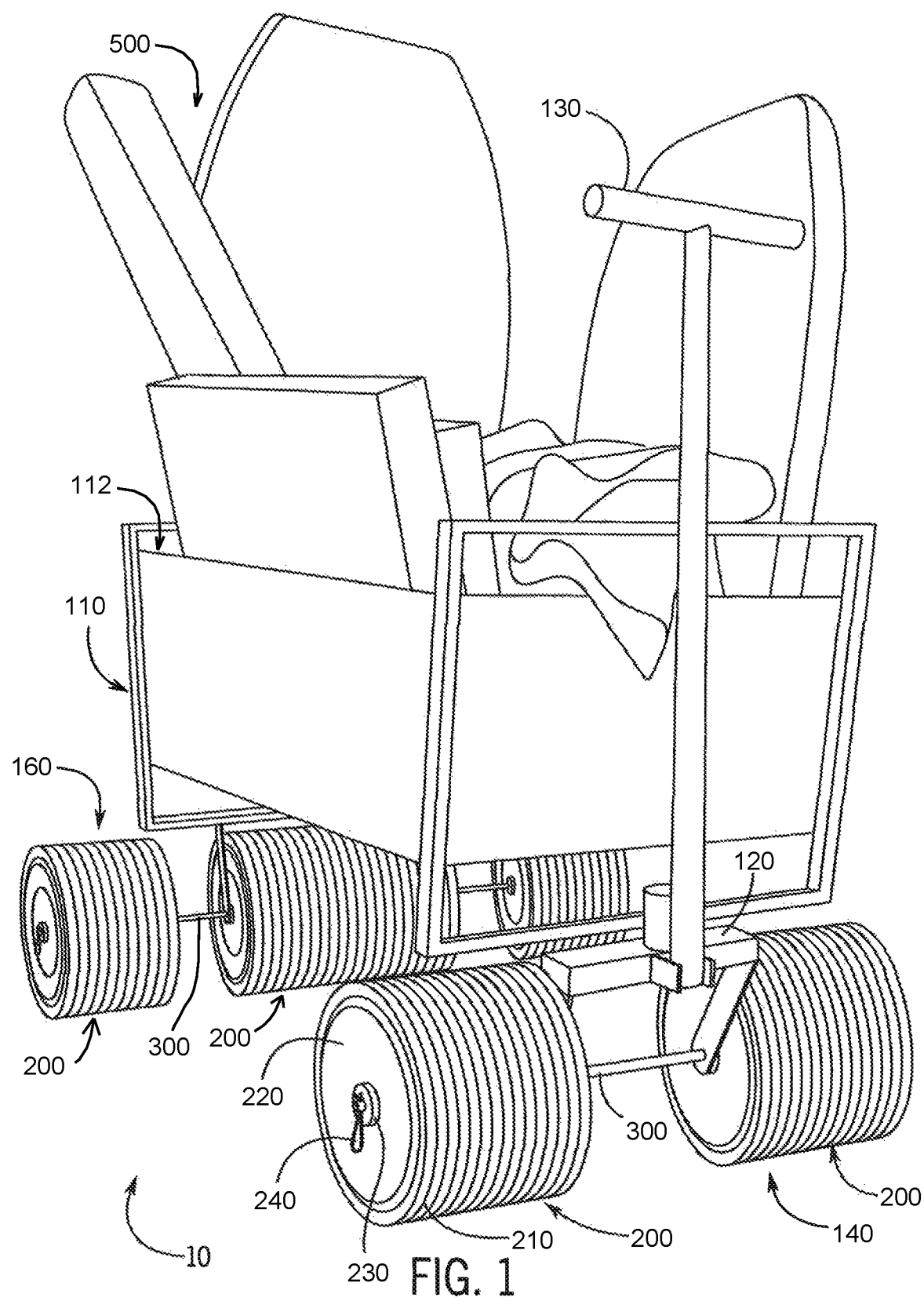
FIG. 1 is a perspective view of a cart according to an embodiment of the invention.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will convey the concept of the invention to those skilled in the art.

A wheel 200 according to an embodiment of the invention is shown in FIGS. 1-5. The wheel 200 can be used in various carts, including a cart 10 according to an embodiment shown in FIG. 1 and a cart 40 according to another embodiment shown in FIG. 5. The cart 10 will be described first and the wheel 200 according to the invention will be described in greater detail below within the context of the cart 10 and the cart 40.

A cart 10 according to an embodiment, as shown in FIG. 1, comprises a frame 110, a pivotal steering unit 120 connected to the frame 110, a handle 130 connected to the pivotal steering unit 120, a first wheel assembly 140 connected to the pivotal steering unit 120, and a second wheel assembly 160 connected to the frame 110.

In the embodiment shown in FIG. 1, the frame 110 has a fixed dimension defining a frame interior 112. The frame 110 in the shown embodiment has an approximately rectangular shape. In various embodiments, the frame 110 may be manufactured out of any rigid material capable of forming the fixed dimension, such as a plastic or a metal. In other embodiments, the frame 110 may have a rigid external structure supporting a flexible material defining the frame interior 112; the flexible material may be a fabric or a plastic. In other embodiments, the frame 110 may be formed of any material and have any shape known to those with ordinary skill in the art and suitable for use in transporting a load in a cart.

The pivotal steering unit 120, as shown in FIG. 1, connects the handle 130 and the first wheel assembly 140 to a first end of the frame 110. The pivotal steering unit 120 may be any kind of pivotal mechanism capable of being manipulated by a user to rotate the first wheel assembly 140 with respect to the frame 110. In various embodiments, the pivotal steering unit 120 may include a ball rotatable within a socket fixed to the frame 110 or a cylinder rotatable within a sleeve fixed to the frame 110.

The handle 130 connected to the pivotal steering unit 120 is capable of pivoting about a point at which the handle 130 is connected to the pivotal steering unit 120. In the embodiment shown in FIG. 1, the handle 130 is capable of rotating about only a single axis with respect to the first wheel assembly 140; a lateral rotation of the handle 130 with respect to the frame 110 causes a corresponding pivoting of the first wheel assembly 140 with respect to the frame 110. In other embodiments, the handle 130 may have a fixed orientation along and about all axes with respect to the pivotal steering unit 120.

The first wheel assembly 140, as shown in FIGS. 1-4, includes a plurality of wheels 200 disposed along and attached to an axle 300. In the shown embodiment, the first wheel assembly 140 includes a pair of wheels 200 disposed on opposite ends of the axle 300. In other embodiments, as will be similarly described below with reference to the second wheel assembly 160, the wheel assemblies 140, 160 may include different numbers and configurations of wheels 200 along the axle 300.

As shown in FIGS. 1-4, each of the wheels 200 includes a hollow cylindrical body 210, a pair of end plates 220 disposed on opposite ends of the hollow cylindrical body 210, a pair of bushings 230 each disposed in one of the end plates 220, and a pair of fasteners 240 each disposed adjacent one of the pair of end plates 220.

Figure 4:
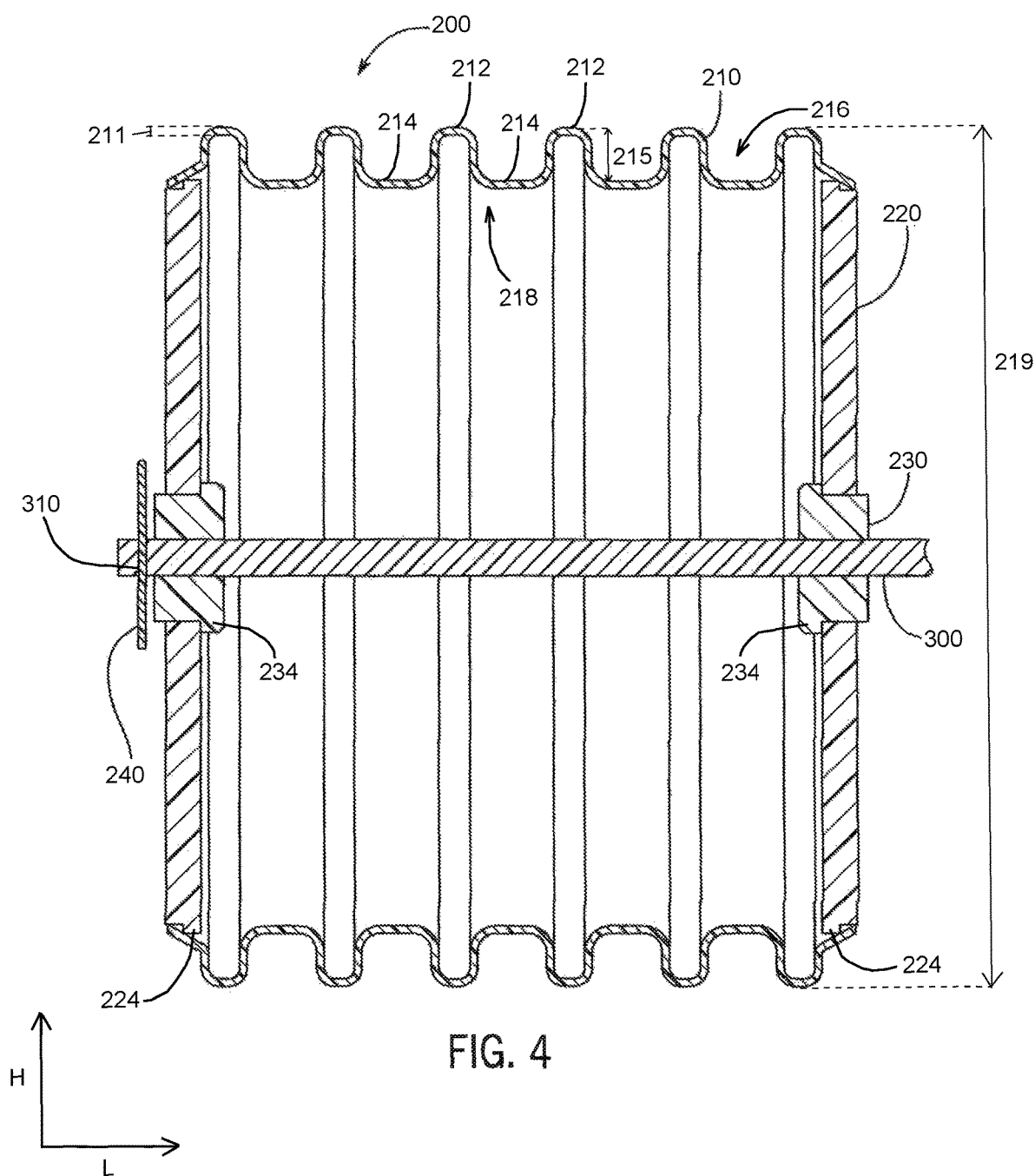
FIG. 4 is a sectional side view of the wheel and the axle of FIG. 3 in an assembled state.

The hollow cylindrical body 210, as shown in FIG. 4, includes a plurality of ridges 212 extending circumferentially around the hollow cylindrical body 210 and a plurality of grooves 214 extending circumferentially around the hollow cylindrical body 210. The ridges 212 and grooves 214 are positioned to alternate with one another along a longitudinal axis L of the hollow cylindrical body 210. The alternating ridges 212 and grooves 214 form a corrugated outer surface 216 and a corrugated inner surface 218 of the hollow cylindrical body 210. Each of the ridges 212 protrudes beyond an adjacent groove 214 by a protruding distance 215 in a height direction H of the hollow cylindrical body 210. In an embodiment, the protruding distance 215 is approximately ⅝". In the shown embodiment, each of the ridges 212 extends approximately perpendicularly with respect to the adjacent groove 214 in the height direction H. In other embodiments, each of the ridges 212 may extend at an obtuse angle with respect to the adjacent groove 214 or may have a shape that is curved with respect to the adjacent groove 214.

The hollow cylindrical body 210 is formed from a lightweight, stiff, and durable material. The hollow cylindrical body 210 may be formed from a plastic material and, in an embodiment, is formed from a high-density polyethylene (HDPE) material. The material of the hollow cylindrical body 210 has a stiffness greater than that of a material intended to be inflated, such as an inflatable rubber tire or a balloon wheel. The stiffness of the material of the hollow cylindrical body 210 is sufficient to avoid denting or deformation when supporting a load and traveling over rough terrain, such as rocks.

As shown in FIG. 4, the hollow cylindrical body 210 has a thickness 211 in the height direction H of the body 210. In an embodiment, the thickness 211 is approximately ⁷⁄₁₆". The hollow cylindrical body 210 has an outer diameter 219 in the height direction H of the body 210. In an embodiment, the outer diameter 219 is approximately 9⅜". In an embodiment, the thickness 211 is less than 10% of the outer diameter 219 and, in another embodiment the thickness 211 is approximately 5% of the outer diameter 219. In an embodiment, the thickness 211 is greater than 50% and less than 100% of the protruding distance 215 and, in another embodiment the thickness 211 is approximately 70% of the protruding distance 215. The small dimension of the thickness 211 with respect to the outer diameter 219 and the protruding distance 215 allows the hollow cylindrical body 210 to be lightweight and stiff. The corrugated outer surface 216 and the corrugated inner surface 218 of the hollow cylindrical body 210 allows the thickness 211 to be small while remaining durable.

Figure 3:
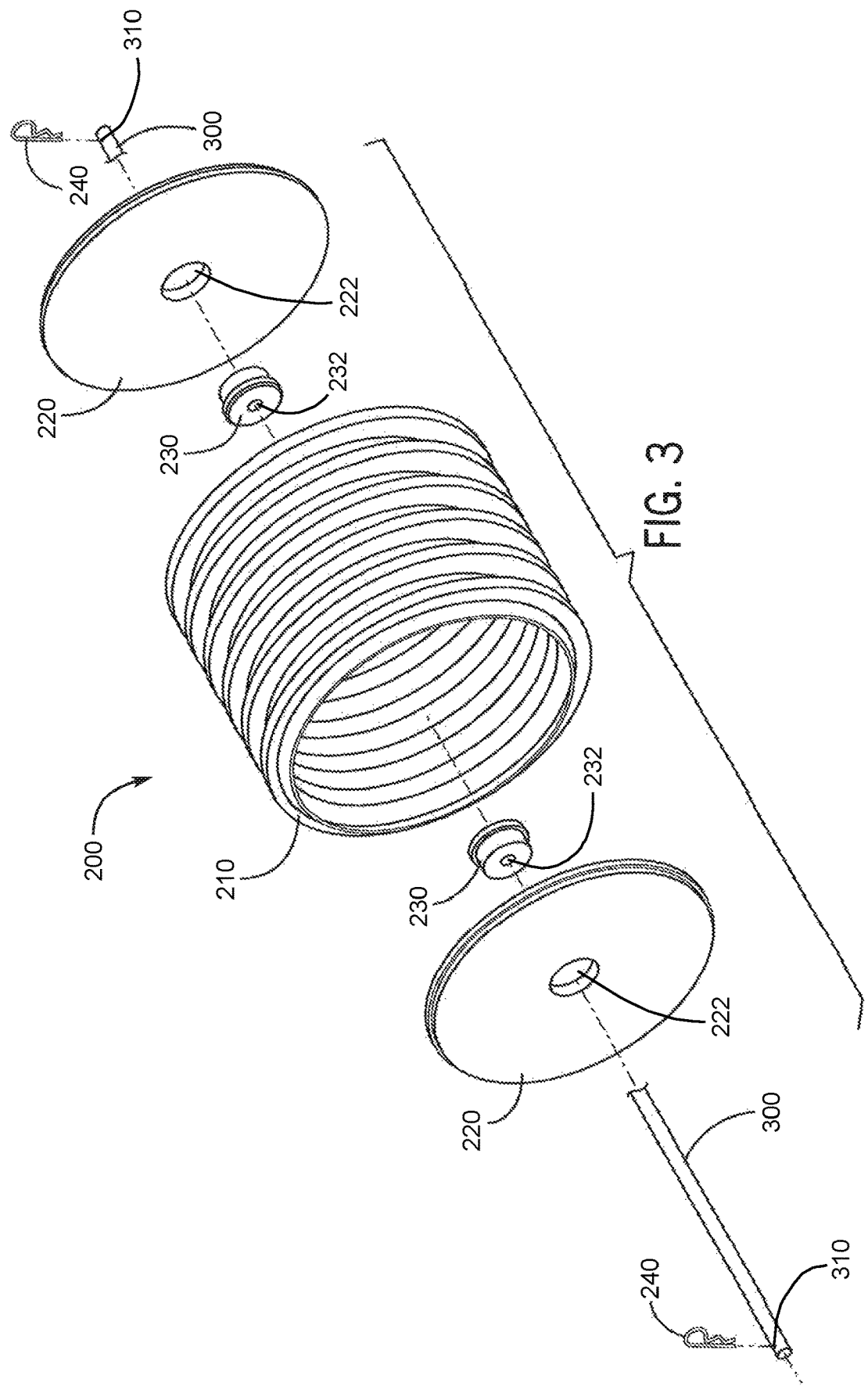
FIG. 3 is an exploded perspective view of a wheel and an axle of the wheel assembly of FIG. 2.

The hollow cylindrical body 210 is formed such that opposite ends of the body 210, as shown in FIG. 4, end at a groove 214. The end plates 220, as shown in FIGS. 3 and 4, are inserted into and positioned at opposite ends of the hollow cylindrical body 210. Each end plate 220 is circular and includes a bushing receiving passageway 222 positioned in a center of and extending through the circular end plate 220 and a plate flange 224 having a larger outer diameter than a remainder of the end plate 220. In an embodiment, each of the end plates 220 is formed of a plastic material and, in another embodiment is formed of a polyvinyl chloride (PVC) material. As shown in FIG. 4, a diameter distance between the grooves 214 of the body 210 along the height direction H is larger than a diameter of a portion of the end plates 220 but is smaller than a diameter of the plate flange 224 of the end plates 220. A portion of each end plate 220 is positioned between the grooves 214 at the ends of the hollow cylindrical body 210 and the plate flange 224 abuts the body 210 to hold the end plate 220 at the end of the body 210. An interior of the body 210 is empty except for the aforementioned components.

Each of the bushings 230, as shown in FIGS. 3 and 4, is positioned in the bushing receiving passageway 222 of one of the end plates 220. Each bushing 230 is circular and includes an axle receiving passageway 232 positioned in a center of and extending through the bushing 230 and a bushing flange 234 having a larger outer diameter than a remainder of the bushing 230. In an embodiment, each of the bushings 230 is formed of an elastically deformable material, such as a plastic or a rubber. The bushing 230 is inserted from the plate flange 224 side of the end plate 220 until the bushing flange 234 abuts the end plate 220. The elastically deformable material of the bushing 230 forms an interference fit in the bushing receiving passageway 222.

The axle 300, as shown in FIGS. 3 and 4, is an elongated cylindrical member having a plurality of fastener receiving passageways 310 dispersed along the axle 300 and extending through the axle 300. In an embodiment, the axle 300 is formed of a metal material and, in a further embodiment, is zinc-coated.

To assemble the wheel 200 on the axle 300, the axle 300 is inserted through the axle receiving passageway 232 of each bushing 230 and extends through a center of the hollow cylindrical body 210. The fastener receiving passageways 310 are positioned along the axle 300 such that a fastener receiving passageway 310 is positioned adjacent to an exterior side of each bushing 230. Each of the fasteners 240, in the embodiment shown in FIGS. 1-4, is a hitch pin clip. In other embodiments, the fasteners 240 may be any other type of fastener known to those with ordinary skill in the art and capable of fastening the elements described herein. Each fastener 240 is removably positioned in one of the fastener receiving passageways 310 and holds the wheel 200 in a particular position on the axle 300, restricting movement of the wheel 200 along a length of the axle 300.

Figure 2:
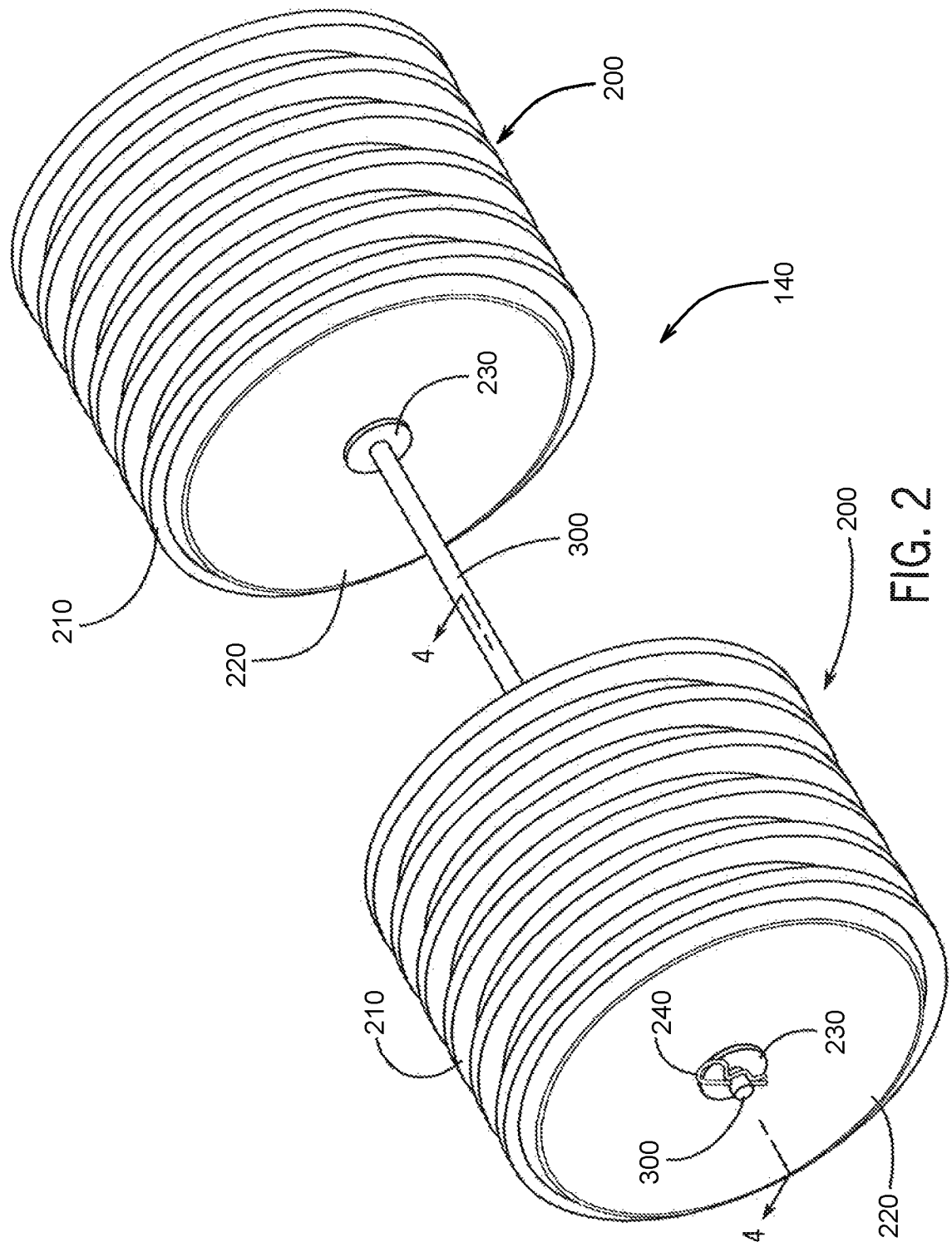
FIG. 2 is a perspective view of a wheel assembly of the cart of FIG. 1.

As shown in FIGS. 1 and 2, different numbers of wheels 200 may be assembled on the axle 300. In the shown embodiment, the first wheel assembly 140 has two wheels 200 assembled on the axle 300 and the second wheel assembly 160 has three wheels 200 assembled on the axle 300. A length of each wheel 200 along the longitudinal direction L can also vary between and within wheel assemblies 140, 160. As shown in FIG. 1, the wheels 200 can be formed with various lengths. In an embodiment, a length of each wheel 200 in the longitudinal direction L is greater than or equal to 6" and less than or equal to 12". The thickness 211, protruding distance 215, and outer diameter 219 of the hollow cylindrical body 210 remain the same, and the end plates 220, bushings 230 and fasteners 240 are assembled the same; the hollow cylindrical body 210 only varies in the number of alternating ridges 212 and grooves 214 to form the hollow cylindrical body 210 with a different length. In an embodiment, the hollow cylindrical body 210 is a section of a corrugated drainage pipe and is cut to a selected length along the longitudinal direction L from a longer piece of corrugated drainage pipe. The second wheel assembly 160 has the same components and is constructed the same way as the first wheel assembly 140 described above, but differs only in the number of wheels 200 and a length of each wheel 200 along the longitudinal direction L.

As shown in FIG. 1, the axle 300 of the first wheel assembly 140 is connected to the pivotal steering unit 120 and the axle 300 of the second wheel assembly 160 is attached to an end of the frame 110 opposite the pivotal steering unit 120. The axle 300 of the first wheel assembly 140 is rotatable with respect to the pivotal steering unit 120 and the axle 300 of the second wheel assembly 160 is rotatable with respect to the frame 110.

To use the cart 10, as shown in FIG. 1, a user can position a load 500 in the frame interior 112. The load 500 varies based on the application of the cart 10; in the shown embodiment, the load 500 is beach equipment. The frame 110 supports the load 500 and the wheels 200 contact a terrain on which the cart 10 is positioned. The user manipulates the handle 130 to pull the cart 10, rotating the wheel assemblies 140, 160, and can use the handle 130 to turn the pivotal steering unit 120 and rotate the first wheel assembly 140 to steer the cart 10 along the terrain. The lightweight wheels 200 permit easier travel over difficult terrain, such as sand. Further, the wheels 200 are durable and do not require periodic maintenance.

In another application, the first wheel assembly 140 and/or the second wheel assembly 160 can be used to replace the wheels and axles of an existing cart. The axle 300 has an outer diameter sized to fit the frames and steering mechanisms of a wide range of existing carts. The user can remove the wheels of the existing cart and can attach the first wheel assembly 140 and/or the second wheel assembly 160 to the existing cart, assembled as described above, in order to convert the existing cart into the cart 10 shown and described above. The same conversion can also be performed with wheel assemblies according to other embodiments having different numbers of wheels 200 and wheels 200 with different lengths.

Figure 5:
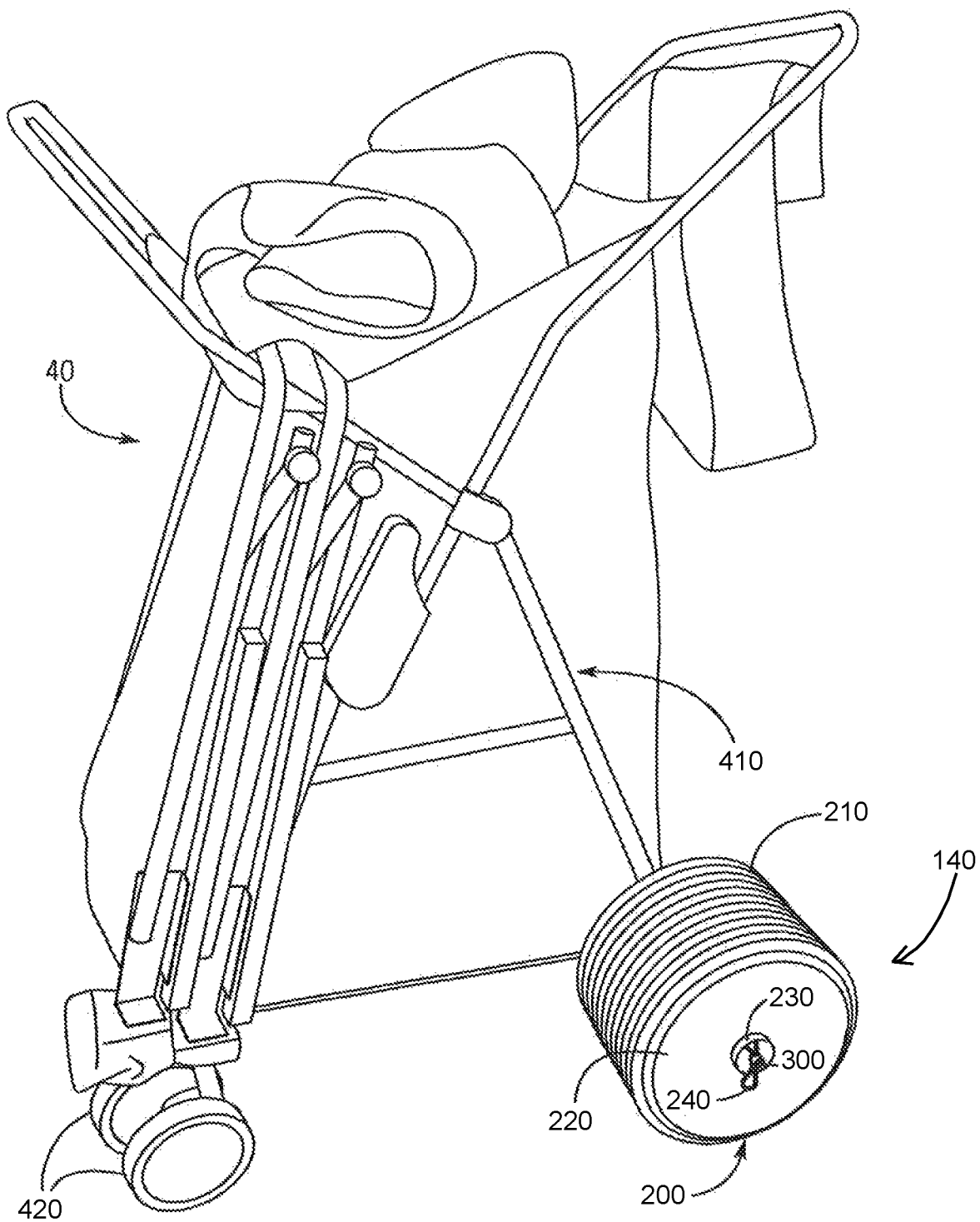
FIG. 5 is a perspective view of a cart according to another embodiment of the invention.

A cart 40 according to another embodiment, as shown in FIG. 5, comprises a frame 410, a pair of auxiliary wheels 420 positioned at an end of the frame 410, and the first wheel assembly 140 positioned at an end of the frame 410 opposite the auxiliary wheels 420. Like reference numbers refer to like elements and only the differences of the cart 40 with respect the cart 10 will be described in greater detail herein.

In the embodiment shown in FIG. 5, the frame 410 is a foldable or collapsible frame that does not have a rigid outer dimension but rather can expand for use and contract for storage. The axle 300 of the first wheel assembly 140 is attached to the frame 410 and is rotatable with respect to the frame 410. In the embodiment shown in FIG. 5, the first wheel assembly 140 is not pivotable with respect to the frame 410. The auxiliary wheels 420 are attached to the frame 410 and are rotatable with respect to the frame 410. In the shown embodiment the auxiliary wheels 420 are solid wheels having a thin width. In another embodiment, the auxiliary wheels 420 could be replaced with another first wheel assembly 140, the second wheel assembly 160, or another wheel assembly having a different number of wheels 200 or wheels 200 of a different length.

What is claimed is:

1. A wheel for a cart, comprising:
a hollow cylindrical body formed of a stiff material and having a corrugated outer surface and a corrugated inner surface, the corrugated outer surface and the corrugated inner surface are each formed from a plurality of ridges and a plurality of grooves extending circumferentially around the hollow cylindrical body; and
a pair of end plates positioned in opposite ends of the hollow cylindrical body, each of the end plates has a plate flange.

2. The wheel of claim 1, wherein each of the ridges protrudes beyond an adjacent one of the grooves by a protruding distance in a height direction, a thickness of the hollow cylindrical body in the height direction is less than the protruding distance.

3. The wheel of claim 1, wherein the hollow cylindrical body has a thickness that is less than 10% of an outer diameter of the hollow cylindrical body.

4. The wheel of claim 1, wherein the ridges and grooves are positioned to alternate with one another along a longitudinal axis of the hollow cylindrical body.

5. The wheel of claim 4, wherein the ridges extend approximately perpendicularly with respect to the grooves.

6. The wheel of claim 1, wherein the stiff material has a stiffness greater than that of a material intended to be inflated.

7. The wheel of claim 1, wherein the stiff material is a high-density polyethylene.

8. The wheel of claim 1, wherein a diameter distance between the grooves of the hollow cylindrical body is greater than a diameter of a portion of the end plate and smaller than a diameter of the plate flange, the plate flange of each end plate abuts the hollow cylindrical body.

9. The wheel of claim 8, further comprising a pair of bushings each formed of an elastically deformable material, each of the bushings is positioned in a bushing receiving passageway of one of the end plates.

10. The wheel of claim 9, wherein each of the bushings has a bushing flange abutting a side of the end plate having the plate flange.

11. A wheel assembly for a cart, comprising:
an axle; and
a wheel positioned along the axle, the wheel has a hollow cylindrical body formed of a stiff material with a corrugated outer surface and a corrugated inner surface, the wheel has a pair of end plates positioned in opposite ends of the hollow cylindrical body and a pair of bushings each positioned in a bushing receiving passageway of one of the end plates.

12. The wheel assembly of claim 11, wherein the axle extends through an axle receiving passageway of each bushing and through a center of the hollow cylindrical body.

13. The wheel assembly of claim 12, wherein the axle has a plurality of fastener receiving passageways dispersed along the axle and extending through the axle, a plurality of fasteners are positioned in the fastener receiving passageways and restrict movement of the wheel along a length of the axle.

14. The wheel assembly of claim 11, wherein the axle is formed of a metal material and is zinc-coated.

15. A cart, comprising:
a frame; and
a first wheel assembly connected to the frame, the first wheel assembly including a first axle and a first wheel positioned along the first axle, the first wheel has a hollow cylindrical body formed of a stiff material with a corrugated outer surface and a corrugated inner surface, the first wheel has a pair of end plates positioned in opposite ends of the hollow cylindrical body and a pair of bushings each positioned in a bushing receiving passageway of one of the end plates.

16. The cart of claim 15, further comprising a second wheel assembly connected to the frame, the second wheel assembly including a second axle and a second wheel positioned along the second axle, the second wheel has a hollow cylindrical body formed of a stiff material with a corrugated outer surface and a corrugated inner surface and has a length different than a length of the hollow cylindrical body of the first wheel.

17. The cart of claim 15, further comprising a handle and a pivotal steering unit connecting the handle and the first wheel assembly to the frame.

18. A wheel for a cart, comprising:
a hollow cylindrical body formed of a stiff material and having a corrugated outer surface and a corrugated inner surface, the corrugated outer surface and the corrugated inner surface are each formed from a plurality of ridges and a plurality of grooves extending circumferentially around the hollow cylindrical body, each of the ridges protrudes beyond an adjacent one of the grooves by a protruding distance in a height direction, a thickness of the hollow cylindrical body in the height direction is less than the protruding distance.

* * * * *